P. BROMAN & J. OFFERMAN.
FEED MECHANISM FOR GRAIN DRILLS.
APPLICATION FILED FEB. 5, 1912.
1,075,813.
Patented Oct. 14, 1913.
2 SHEETS—SHEET 1.
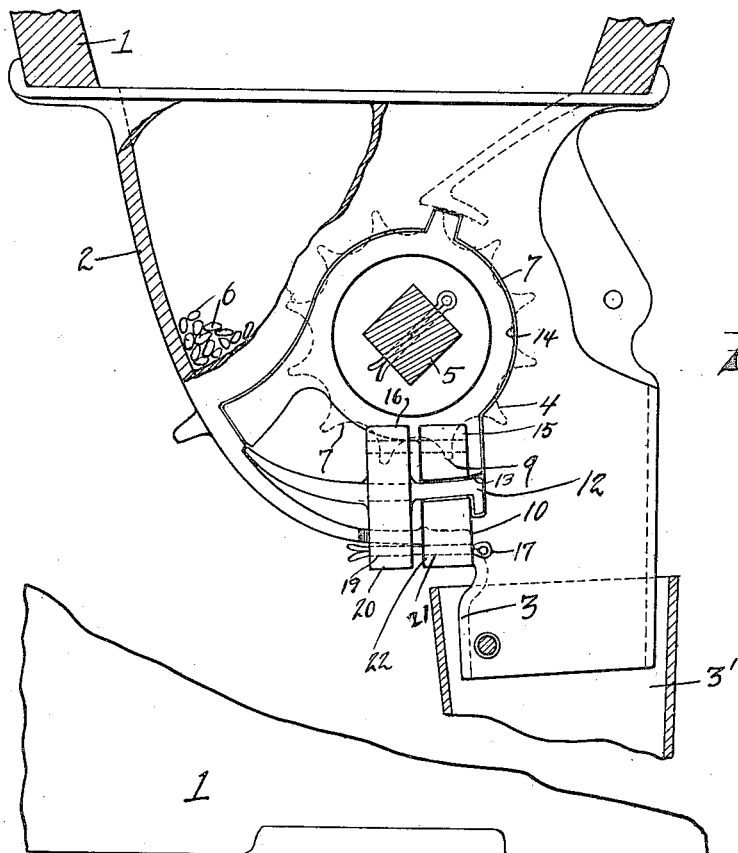
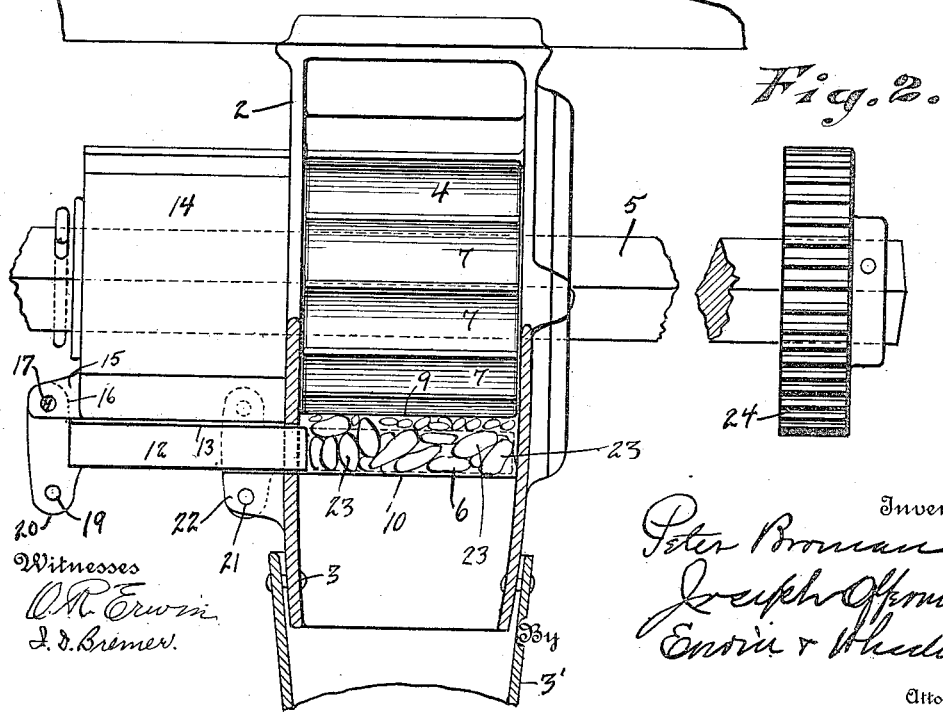

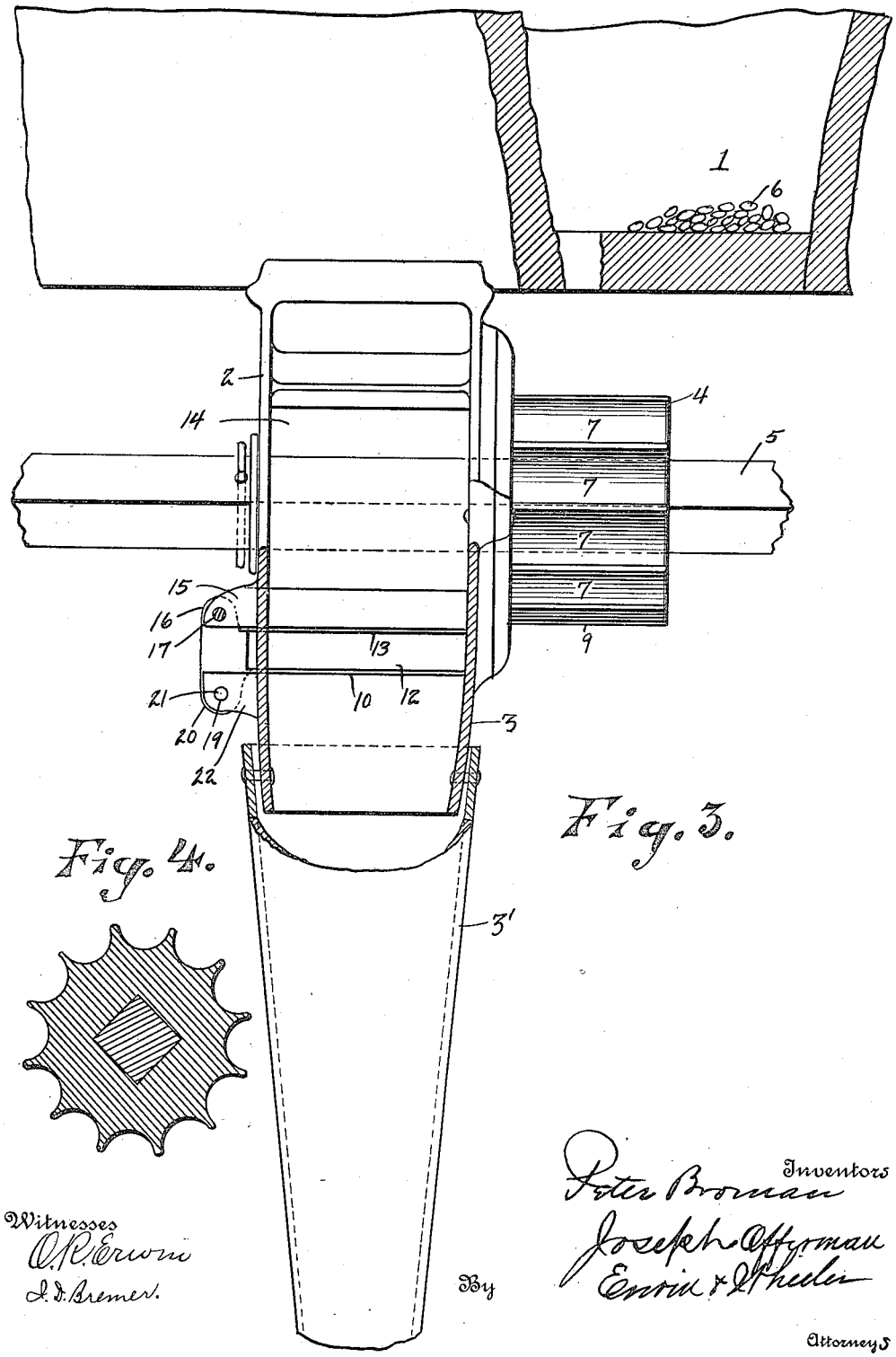

UNITED STATES PATENT OFFICE.

PETER BROMAN AND JOSEPH OFFERMAN, OF BEAVER DAM, WISCONSIN, ASSIGNORS TO BEAVER DAM MFG. CO., OF BEAVER DAM, WISCONSIN, A CORPORATION OF WISCONSIN.

FEED MECHANISM FOR GRAIN-DRILLS.

1,075,813.

Specification of Letters Patent.  Patented Oct. 14, 1913.

Application filed February 5, 1912. Serial No. 675,435.

*To all whom it may concern:*

Be it known that we, PETER BROMAN and JOSEPH OFFERMAN, citizens of the United States, residing at Beaver Dam, county of Dodge, and State of Wisconsin, have invented new and useful Improvements in Feed Mechanism for Grain-Drills, of which the following is a specification.

Our invention relates to improvements in feed mechanism for grain drills.

It is a well known fact that a much larger discharge opening is required for the passage of beans, peas, corn, etc., than for wheat and other small grain, and that grain which can be readily fed by a corrugated feed roller through a large discharge opening would be liable to choke up a smaller aperture, or crushed between such roller and the walls of the smaller opening.

The object of our invention is, therefore, to provide a feed mechanism which may be readily and quickly adjusted for feeding grain of various different sizes.

In the following description, reference is had to the accompanying drawings, in which—

Figure 1 represents an end view, part in section. Fig. 2 represents a front view, part broken away to show the interior, the device being adjusted for sowing large grains. Fig. 3 is a side view of the device shown in Fig. 2, adjusted for preventing the escape of grain, and Fig. 4 is a cross section of the grooved end of the cylinder.

Like parts are identified by the same reference numerals throughout the several views.

1 represents a hopper of an ordinary grain drill in which a quantity of grain is placed preparatory to operating the drill. It will be understood that each hopper is connected with a series of feed chambers, each of which feed chambers is connected through a feed duct with one of the teeth of the drill. The feed mechanism, inclosing chambers, ducts, etc., which are connected with the several drill teeth, are substantially alike and it therefore becomes unnecessary to show more than one of the devices embodying our invention.

2 represents the feed chamber, into which the grain flows of its own gravity from the hopper 1, when it is conveyed from the feed chamber to the discharge ducts 3 and 3′ by the corrugated feed roll 4. The feed roll 4 is affixed to the revoluble shaft 5 and is adapted to revolve with it, whereby the grain 6 is conveyed from the chamber 2 to the duct by and between the longitudinal grooves 7 of said feed roll, as shown in Fig. 1, when it drops of its own gravity through said duct to the ground in rear of the drill teeth in the ordinary manner.

The hopper 1, chamber 2, feed roll 4, shaft 5, and ducts 3 and 3′, are all substantially of ordinary construction, and invention herein is predicated more especially upon the mechanism for increasing and diminishing the discharge space between the lower edge 9 of the feed roll and the upper edge 10 of the discharge duct, whereby the same mechanism is adapted to be used, as stated, for feeding grain of different sizes.

The device, when adjusted as shown in Fig. 2, is adapted to be used for sowing large kernels of grain, as shown in said figure. When, however, smaller grain is used, a sliding partition 12 is drawn beneath the feed roll 4, when the smaller grain passes between the lower edge 9 of the feed roll and the upper edge 13 of the partition 12. The partition 12 is connected with a slidable cylinder 14 by the lugs 15 and 16 and the removable pin 17. The cylinder 14 is non-revolubly but slidably supported at one side of or within the walls of the feed chamber 2 upon the revoluble shaft 5 and said shaft, cylinder and feed roll are adapted to be moved toward the right and left (reference being had to Figs. 2 and 3). When the shaft 5 is drawn toward the right, the feed roll 4 will be caused to extend upon the right hand side of the feed chamber, as shown in Fig. 3, in which case the non-revoluble cylinder 14 is brought within the feed chamber, whereby the discharge throat of the feed chamber is entirely closed and the grain is prevented from escaping from the hopper. When, however, it is desirous to use the drill for sowing grain, the shaft 5 is moved toward the left, reference being had to said Fig. 2, whereby the feed cylinder 4 is again brought into place within the feed chamber, when the slidable cylinder 14 is again brought upon the left hand side of the feed chamber, as shown in said Fig. 2. It will now be understood that when desirous to sow small grain, the slidable partition 12 is retained in place beneath the feed chamber by inserting a pin through the aperture 19 of the lug 20 and the aperture 21 of the lug 22, whereby the partition 12 is retained in place as the drill is operated. When, however, it is desirous to sow large grain, the partition 12 is connected with the cylinder 14 by inserting the pin 17 through the apertures of the lugs 15 and 16, whereby the partition 12 is adapted to be drawn outside of the feed chamber as shown in Fig. 2, when the larger kernels of grain 23 are free to pass from the feed chamber to the discharge ducts, as shown in said Fig. 2. The lug 22 is formed on one side of the chamber 2, the lug 15 is formed on one end of the slidable hollow cylinder 14, and the lugs 16 and 20 are both formed in connection with the protruding end of the slidable gate or partition 12, whereby the slidable gate or partition 12 is adapted to be connected through the pin 17 either with the stationary chamber 2 or with the slidable cylinder 14, according to the position of said pin 17. The full lines in Fig. 2 show the gate or sliding partition withdrawn from beneath the feeding roll in position for sowing large grain, while the dotted lines in Fig. 2 and the full lines in Fig. 3 show the gate or sliding partition in its closed position beneath the feed roll.

While we have shown and thus far described a single feed chamber and the mechanism connected with the revoluble shaft 5, it will be understood, as previously stated, that a plurality of devices like that shown and described, is connected in like manner with said shaft 5 and that the feed rolls are all simultaneously revolved by the revolving movement of said shaft. Motion is communicated to the shaft 5 from motive power of the drill, not shown, through the pinion 24, or in any other convenient manner.

When adjusting the partition 12 for various sizes of grain, the same pin 17 is removed from the upper lugs 15 and 16 to the lower lugs 20 and 22, or vice versa. When the pin is inserted through the upper lugs 15 and 16, said partition will be drawn out by the longitudinal movement of the driving shaft 5. When, however, the drill is used for sowing smaller grain, said partition is retained in the reverse position beneath the feed roll 4 by inserting the pin 17 through said lugs 20 and 22, whereby said partition will be retained, as stated, in place beneath the feed roll. It will of course be understood that each feed chamber 2 throughout the series, is provided with a similar partition 12 to that shown and that all of said partitions are adapted to be adjusted for sowing large or small grain in the manner described.

Having thus described our invention, what we claim as new, and desire to secure by Letters Patent, is—

1. In a grain drill, the combination of a plurality of feed chambers arranged in a horizontal series beneath the hopper of the drill, a revoluble shaft extending through apertures provided therefor in each of said feed chambers, a corrugated revoluble feed roll and a non-revoluble cylinder connected with said shaft, a slidable partition interposed between said feed roll and the opposing wall of said feed chamber, means for temporarily connecting said partition to said chamber and thereby retaining it in place beneath said feed roll when sowing small grain, and means for connecting said partition with said non-revoluble cylinder at one side of said feed chamber when sowing large grain.

2. In a grain drill, the combination of a plurality of feed chambers arranged in a horizontal series beneath the hopper of the drill, each of said feed chambers being provided upon one side with an apertured lug, a revoluble shaft extending through apertures provided therefor in each of said feed chambers, a corrugated revoluble feed roll and a non-revoluble cylinder connected with said shaft, said non-revoluble cylinder being provided upon one side with an apertured lug, a slidable partition interposed between said feed roll and the opposing wall of said feed chamber, said slidable partition being provided upon its respective upper and lower sides with apertured lugs respectively adapted to register with the lugs of said feed chamber and slidable cylinder, a pin for connecting one of the lugs of said partition with said slidable cylinder when withdrawn from said feed chamber, and said pin being also adapted to be used for connecting the opposite lug of said partition with the lug of said feed chamber when said partition is in place beneath the feed roll, all substantially as and for the purpose specified.

In testimony whereof we affix our signatures in the presence of two witnesses.

PETER BROMAN.
JOSEPH OFFERMAN.

Witnesses:
 JOHN C. HEALY,
 JAMES T. HEALY.

---

Copies of this patent may be obtained for five cents each, by addressing the "Commissioner of Patents, Washington, D. C."